April 20, 1954  O. BOYER  2,675,750
AGRICULTURAL MACHINE

Filed April 22, 1947  5 Sheets-Sheet 1

FIG. 1

INVENTOR.
Oliver Boyer
BY
Philip E. Liggett
atty.

April 20, 1954     O. BOYER     2,675,750
AGRICULTURAL MACHINE Filed April 22, 1947     5 Sheets-Sheet 5

INVENTOR.
Oliver Boyer
BY Philip E. Liggus
atty.

Patented Apr. 20, 1954

2,675,750

UNITED STATES PATENT OFFICE 2,675,750

AGRICULTURAL MACHINE

Oliver Boyer, Spencerville, Ohio, assignor of one-fourth to Philip E. Siggers, Wilmington, Del.

Application April 22, 1947, Serial No. 743,073

25 Claims. (Cl. 97—40)

This invention relates to agricultural machines, and among other objects aims to provide:

(1) A machine which is self-propelled and highly maneuverable, so that it may be reversed without backing or swinging through an arc; that is, it may turn itself through 180° while pivoting on one of its wheels.

(2) A machine which may be driven with equal ease in either direction, and may have a crop or soil-working implement either ahead of the front wheels or between the rear wheels, as the case may be.

(3) A self-propelled machine which may travel along highways and also in cultivated areas, with the crop or soil-working implement power-driven at the will of the operator and at speeds under his control.

(4) A machine which though sturdy is extremely light in weight (considering its crop or soil-working capacity) and hence is inexpensive to build and requires a very small power plant (7½ to 10 H. P.), therefore is inexpensive to operate.

(5) A machine adapted for mowing, especially light duty mowing (such as wheat stubble after combining, or weed tops in clover crops grown for seed), which cuts a wide swath (12 ft.) ahead of every part of the machine, so that the ground wheels do not flatten the crop being mowed.

(6) A machine well adapted for cultivating or loosening the soil around crops, not only because of its extreme maneuverability, but also because it employs novel and highly efficient earth-working elements to be described.

(7) A self-propelled cultivator whose rear wheels are driven through a differential and may be braked independently of each other to permit one wheel to be held against rotation while the other is power-driven, thereby turning the machine about the ground-engaging surface of the braked wheel as an axis.

(8) A self-propelled mower having a hand-steered wheel at the rear end and two power-driven wheels at the front end, either of the power-driven wheels being braked at will to aid in steering, while the other pulls the machine around.

(9) A self-propelled cultivator having toothed disks arranged in preferably two gangs both driven through a differential, so that each gang is capable of being braked independently to aid in turning the machine.

(10) A frame for supporting a motor and implement controls which has substantially the shape of an equilateral triangle, for maximum strength and visibility of the ground ahead or to either side of the machine.

(11) A machine which is made up almost entirely of stock shapes and parts, which therefore may be built without highly skilled labor and may be repaired for the most part on the farm or at a crossroads shop or garage.

(12) A machine all of whose controls are within easy reach of, and are easily operated by, the operator.

(13) An agricultural machine which is self-propelled and has three speeds forward and one reverse, the same as an automobile, together with a differential and individual brakes for the two driving wheels.

(14) A mowing machine with a cutter bar forward of the front wheels and with a unique arrangement of helper springs to support the weight of the cutter bar yieldingly, and to ease the work of lifting the cutter bar.

(15) An agricultural machine with frame members at one end adapted to pivotally support a cutter bar for mowing, or alternatively, an assembly of two gangs of toothed cultivator disks.

(16) A agricultural machine which will have an exceptionally high capacity, possibly unequalled for its size and power.

The invention has other objects and advantages as will be apparent from the following description of the preferred embodiment of the machine proper with two illustrative implements mounted thereon.

In the accompanying drawings forming a part of this specification—

Fig. 1 is a perspective view of the machine with the mower attachment mounted thereon;

A description of the machine proper, i. e., without any soil or crop-working implement thereon, will be offered before describing two illustrative attachments (a mower and a cultivator) mounted on and operated by the machine.

The machine proper

Referring particularly to the drawings, the machine frame is preferably a flat frame made principally of angle iron, and substantially in the form of an equilateral triangle with two elongated quadrilateral frames attached to one of the three sides of the triangle and lying in substantially the same plane. This flat or plane machine frame consists of three angle bars 31, 32, 33 bolted or riveted together, each being about 9 ft. long. Angle bars 31, 32 are secured together at one apex of the triangle by a bolted or riveted plate 34 which supports a bearing for a swiveled ground wheel or wheels for aiding in steering the machine as will be described. When light angle bars 31, 32 are used, I have found it desirable to stiffen them by means of trussrods (not shown) fixed at their ends to said angle bars and spaced at their middle points from the undersides of the angle bars by spacers. In lieu of such a construction I may employ channels or I-beams, not shown.

Secured as by a weld to each angle bar 31, 32 is another angle bar 35, 36 respectively, the two angle bars 35, 36 being parallel and in the general plane of the frame. Angle bars 35, 36 may be integral with angles 31 and 32, respectively, and whether integral or welded are preferably reinforced by straps 37 (only one being shown), these straps each being on the outside webs of the angles and extending around the obtuse angles between angles 31, 35 and 32, 36 to reinforce the frame at those points and to provide a sufficiently rigid mounting for the two driving or ground wheels 39, 40. The driving wheels have their axles fixed to the parallel angles 35, 36 and are steel wheels (similar to trailer wheels) with pneumatic tires preferably about 28" in diameter (6.00 x 16). Each driving wheel has bolted thereto, on the inside, a large sprocket wheel 41 driven by a sprocket chain 42 which may be of the square link type, as shown, but of course could be of the more efficient rocker pin type or some other well known construction. The power drive for the two sprocket chains 42 will be described presently. Angle bars 35, 36 form the opposite end members for an auxiliary frame which is an integral part of the main frame but viewed separately appears as an elongated quadrilateral adjacent angle 33 of the triangular frame. This auxiliary frame consists of angle 33, another angle 43 parallel to angle 33 and of the same length, with parts of angles 35, 36 forming the short sides or ends of the quadrilateral. Angle 43 may be spaced about 12 in. from angle 33, and has its ends bolted or riveted to angles 35, 36. On top of angle 43 a rocker shaft 44 is mounted, and to this rocker shaft elements (to be described) are secured for manual control of the position of the implement carried by the frame between the ground wheels. Between frame members 33 and 43, a differential 45, brake assemblies 46, 47, and other parts of the power transmitting mechanism are mounted.

With the major elements of the machine frame thus pointed out, certain minor parts of the frame need mentioning before describing the power drive. Spaced from the point where angles 31, 32 are joined together is an angle bar 48 which is secured at its ends to angles 31 and 32 and is parallel to angles 33 and 43. Two more angles 49, 50 extend parallel to each other lengthwise of the machine, with one end of each secured to angle 31 (or 32) and the other secured to angle 33. Preferably angles 49, 50 are both at right angles to angle bars 48 and 33. Two cross bars 51, 52 (also angles) are secured at their ends to angles 49, 50 and extend transversely of the machine parallel to each other. Two additional parallel cross bars 53, 54 are also provided, with their ends secured to angles 49, 50.

Mounted partly on angle 50, partly on cross bar 54, and partly on a flat strap or bar 55 (secured to and resting on top of angle 33 and cross bar 54) is the base of the power plant 56, which may be a 7½ or 10 (rated) H. P. internal combustion engine, with attached fuel tank, muffler, cooling system, and speed control lever. The power plant 56 is not shown in detail because its appearance may vary greatly, according as to whether it is air cooled or water cooled, etc. With the power plant mounted as described, its shaft is toward the steerable wheel of the machine. A flanged pulley 57 is fixed to the motorshaft and drives a flat belt 58 which passes around a large pulley 59 (the "main power pulley") and back over a belt-tightening pulley 59a (Fig. 7) to the grooved pulley. The belt-tightening pulley 59a is carried by a pivoted frame 59b fixed on a horizontal rock shaft above angle 50 and swung by an arm 59c fixed to the rock shaft, said arm in turn being moved by a rod 59d extending transversely of the machine and having pivotal connection with a pedal 59e pivoted on cross bar 53. This belt-tightening mechanism is not shown in full detail because it is not novel and because other similarly acting mechanisms may be employed. The pedal 59e is within easy reach of the right foot of the operator, who sits in a seat 60 fixed to angles 48 and 51 by means of an inverted U-shaped pedestal or leg 60a having a brace 60b (Fig. 1). So long as the operator keeps his foot on the pedal, the main power pulley 59 is driven by the motor, but as soon as he releases the pedal the machine and the implement carried thereby are no longer driven. Thus accidents are obviated, as the machine stops if the driver falls off his seat or shifts his foot for any reason.

The main power pulley 59 is a vertically revolving pulley set crosswise of the machine between cross bars 53, 54, one of its bearings 61 being on top of cross bar 53. A main power shaft (not shown because hidden) is driven by the main power pulley, and a grooved or V-belt pulley 62 is fixed to the main power shaft adjacent the main pulley 59. Next to grooved pulley 62 is a standard automotive transmission 63 (three forward speeds and one reverse speed) with a gear-shift lever 64 extending upwardly therefrom within easy reach of the operator on the seat. If desired, a universal joint may be on the opposite side of the transmission. Differential 45 is driven by the power output side of the transmission. The differential housing only is shown, together with an axle housing 65 similar to those employed at the rear ends of all automobiles driven by two wheels. Usually rear axle assemblies of old, scrapped cars may be used in building this part of the machine. At each end of the axle housing 65 is a brake assembly 46, 47 each consisting of either an external (contracting) or internal (expanding) brake and drum and housing. It will be understood that any well known automotive type of brake assembly is used, each such assembly including brake-element-releasing springs, not shown. The drive shafts 68, 69 extend beyond brake assemblies 46, 47 respectively and are journalled in bearings 70, 71 respectively fixed on top of angles 35, 36. Sprockets 72 are secured to the ends of drive shafts 68, 69 and mesh with sprocket chains 42 to drive the ground wheels 39, 40. Thus the ground wheels are power-driven through the differential, and either wheel may be stationary while the other is rotated, as when making a turn.

The steering wheel and the wheels turned thereby will now be described. See Figs. 1 and 4. Mounted in a bearing 74 fixed to and lying between and below cross bars 51, 52 is a vertical steering shaft 75 with a large steering wheel 76 secured to its upper end. A grooved pulley 77 is keyed to shaft 75 and a steel cable 78 is wrapped about twice around the pulley and also around a larger grooved pulley 79 fixed to a vertical swivel shaft 80. Pulley 79 is directly above the plate 34 which joins angles 31, 32, while shaft 80 extends vertically downwardly through said plate and is partly enclosed in a vertical housing 81 which is held by a V-shaped bracket 82 whose upper ends are welded to the underside of plate 34. The lower end of shaft 80 extends below housing 81 and is bent and secured to an axle housing which carries dual wheels 83, 84, preferably pneumatic-tired wheels about 14" to 16" in over-all diameter. While dual wheels are preferred, a single steerable wheel could be used. By the described arrangement, the operator by turning steering wheel 76 may turn the steerable wheel or wheels 83, 84, and with concomitant control of the driving wheels (as will be explained) he may obtain perfect control over the travel of the machine.

*The mower attachment*

The rocker shaft 44 has three arms 85 (Figs. 1 and 5) welded thereto and extending toward that end of the machine which has the driving wheels. At their outer ends these arms are each connected by a pivot bolt to an angle bracket 85a which includes a horizontal arm having a perforation. A rod 86 passes through the perforation and carries a coil spring 87. The lower end of rod 86 is bent and is pivotally connected with a cutter bar lifting arm 88 (one of three like arms) whose inner end is pivotally connected with a vertical bracket fixed to the underside of angle 43. The free ends of the cutter bar lifting arms 88 are bolted to a cutter bar 89 which is conventional as it carries the usual reciprocating section bar, which is a flat bar to which the individual V-shaped knives 90 are riveted. The cutter bar is about 12 ft. long, and has the usual stationary guards 91, spaced about 3 inches apart, and secured by bolts to the cutter bar. A section head 92 (Fig. 7) is secured to the middle of the section bar and has a pivotal connection, as at 93, with the outer end of a rocker arm 94 which is preferably two spaced angle bars rigidly secured together and pivoted at a point midway between their ends to oscillate in a more or less horizontal plane (assuming that the cutter bar is about horizontal). The pivot 94a of the rocker arm rises vertically from and is rigidly secured to the central cutter bar lifting arm 88. The rocker arm 94, at the machine end, has a connection with a universal joint 95 which is on one end of a pitman 96 which is driven by a crank 97 on the end of a rotary shaft 98 which is journaled on the machine frame to extend lengthwise thereof but underneath angles 33 and 43. Still another angle 99 is fixed to the frame parallel to angle 33 and has a bearing for shaft 98. A grooved or V-belt pulley 100 is fixed to the end of shaft 98 opposite to the crank end and a V-belt 101 is passed around pulley 100 and drives the same from pulley 62 on the power shaft next to the main power pulley 59. Thus whenever the main power pulley revolves, the knives of the mower are reciprocated, assuming that belt 101 is always tight on pulley 100. However, I prefer that a simple belt-tightening mechanism 101a, Fig. 7, be employed to make it possible for the operator to tighten and loosen belt 101, so that the machine may travel without driving the mower. In lieu of such a mechanism, it is very easy for the operator to stop the machine for a moment and disengage belt 101, as for instance when he desires to drive from a barn to the field, or from one farm to another without continuous reciprocation of the knives of the mower.

To assist in supporting the mowing attachment, the two cutter bar lifting arms 88 nearest the driving wheels each have a lever 102 (Fig. 5) fixed thereto and extending upwardly therefrom, and a "helper" spring 103 (which is a powerful coil spring acting in tension) is coupled at one end to the upper end of each lever 102, while the other end is hooked onto an eye-bolt 104 which passes through a perforation in an upright bracket 105 fixed on top of either angle 31, 32. A nut on the eye-bolt 104 bearing against bracket 105 makes possible adjustment of the tension on the "helper" spring, which extends directly over either power shaft 68, 69. These helper springs work in cooperation with a pair of lighter coil springs 106, whose tension is adjusted by eye-bolts 107 passing through brackets 108 fixed on top of angle 33. The other ends of springs 106 are hooked on to levers 109 fixed on rocker shaft 44. Thus the rocker shaft is directly acted upon by tension springs 106. Helper springs 103 are employed only with the mower attachment, which is at the end of three rather long arms 88 and hence is difficult to lift by manual effort alone. Rocker shaft 44 has a lever 110 fixed thereto and a perforated bar 111 is pivotally secured at one end to the upper end of lever 110, the perforations permitting adjustment of the effective length of bar 111. The other end of bar 111 is pivotally connected to a hand lever 112 which is pivoted at its extreme lower end to swing in a vertical plane and which has a spring-actuated dog (not shown) to engage with a notched quadrant 113 secured to angle bar 49. The upper end 112a of the hand lever (Fig. 1) is bent at right angles and has the usual finger-actuated release for the dog. The described mechanism permits the operator while seated to swing the hand lever with his right arm to rock the rocker shaft 44 thereby to lift or lower the mower attachment (or alternatively, the cultivator attachment, but with his left arm, as will be understood from the description to follow). When the mower attachment is lowered, this puts all the tension springs under greater tension. In its lowest position, the cutter bar is partially supported on the ground, and has three V-shaped shoes 114 which may slide along the ground, as will be understood without detailed illustration. However, the machine is best adapted for light mowing duty, with the cutter off the ground.

Figure 2:
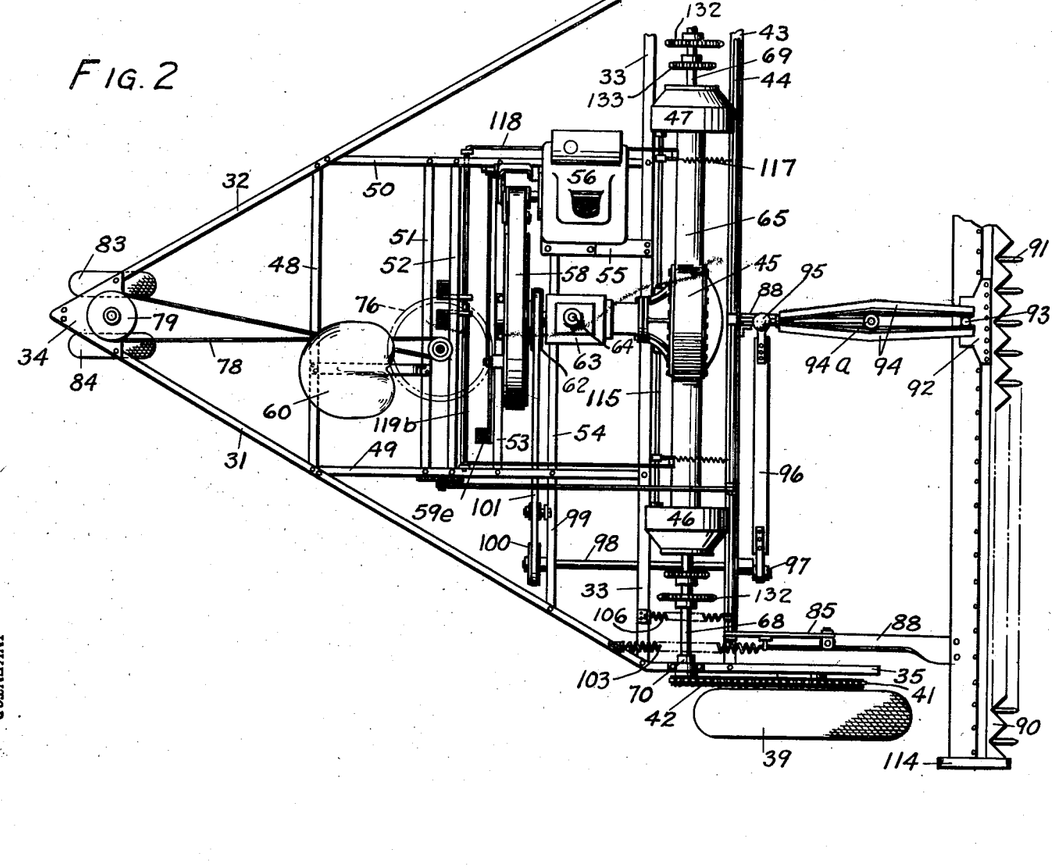
Fig. 2 is a partial plan view of the same.

To brake the power shafts 68, 69 independently, a pair of brake-operating rock-shafts 115 extend into the two brake assemblies and into the differential housing 45. See Figs. 2 and 6. To each rock-shaft 115, an arm 116 is secured so as normally to stand about 45° out of the vertical.

A tension coil spring 117 is fixed at one end to each arm 116 and is secured at its other end to angle 43. To swing each rock-shaft 115 against the resistance of spring 117, a rod 118 is pivotally connected to the outer or free end of each arm 116. Each rod 118 extends past the motor to a pivotal attachment with a perforated lever 119 (perforated for adjustment), said lever 119 being fixed to a shaft 119a (or 119b) extending crosswise of the machine frame. Shaft 119a may be a solid rod, while shaft 119b may be a tube receiving one end of the rod 119a, so that either shaft 119a, 119b may be rocked independently of the other by depressing separately pedals 119c, 119d. Thus the power shafts 68, 69 may be braked independently to brake the ground wheel driven thereby.

The described machine with the mower attached may be driven at three forward speeds and one reverse, may be turned completely around within its own width, and may be guided perfectly. Furthermore, it is very economical to operate and hence is ideal for such light mowing jobs as cutting weed tops and wheat or oats stubble after combining. However, if the change to a cultivator is desired, within an hour one man may make the change.

*The cultivator attachment*

Figure 3:
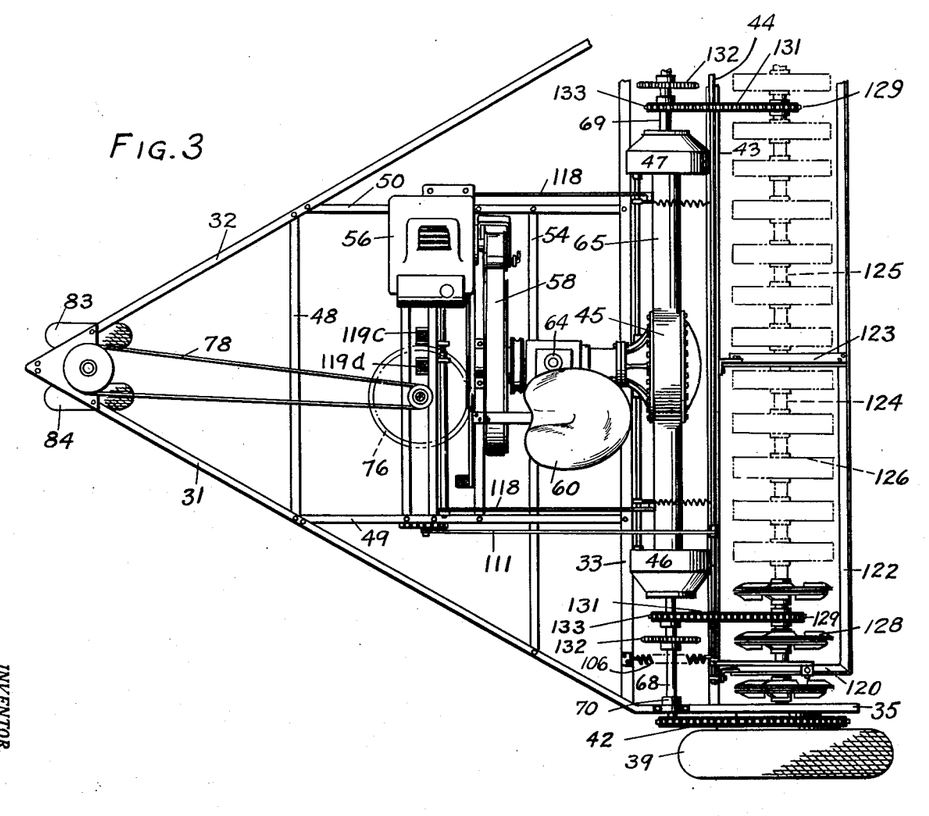
Fig. 3 is a partial plan view of the machine with the cultivator attachment mounted thereon.

The cultivator attachment consists generally of two gangs of cultivator disks, mounted on separately driven shafts which are carried by an E-shaped frame attached to the three lifting arms 85 and located between the ground wheels 39, 40, as shown in Fig. 3.

In the preferred arrangement, the E-shaped frame consists of two angle bars 120 at the frame ends, and a long angle bar 122 which extends transversely of the machine and is parallel to angle 43, being riveted to the outer ends of angles 120. A short angle 123 is parallel to the end angles 120 and is secured to angle bar 122 at its mid point. The three short angles 120, 123 provide means by which the bearings of two aligned but non-connected shafts 124, 125 may be secured to the E-frame as by V-bolts or the like, and also provide means for direct attachment of the E-frame to arms 85, so that the rocker shaft 44 may lift and lower the cultivator attachment as a unit.

Each shaft 124, 125 carries eight cultivator disks 126, hence there are sixteen disks in all, making it possible for the described machine to cultivate simultaneously sixteen rows of beans, corn or other crops. Preferably two of the sixteen disks are located just beyond the ends 120 of the E-frame. Each disk 126 (Fig. 8) preferably is about 11 inches in diameter, made of flat sheet steel about 10 gauge, each bolted on a collar 127 which is keyed to one of the shafts 124, 125, which are both splined for this purpose. While disks 126 could be round, for convenience in assembling the teeth to be described, the perimeter of each disk is a dodecahedron (12-sided polygon), as there are twelve teeth 128 riveted to each disk, six on each face. Preferably each tooth 128 is made of angle iron and is about 7 inches long over-all and 1 inch wide on either side, with a point formed by beveling the two webs of the angle. Preferably each beveled edge is about 2 inches long. Each tooth is secured at an angle of about 45° relative to a radial line extending from the axis of a disk out to the perimeter at right angles to the side of the polygon adjacent which the tooth is secured. This arrangement insures that the points of the teeth will enter the soil almost vertically, which is a desirable feature. If the points were radially disposed, the teeth would scratch the ground instead of digging into it. The direction of rotation of the disks is such that the machine is helped along or actually pushed ahead. While the points are 4½ inches apart, because of the speed at which shafts 124, 125 are revolved, the points "cut the ground" every inch, that is, as the machine advances, each inch of soil which passes under a disk is penetrated by one of the teeth. This is one of the important advantages of the machine.

To drive shafts 124, 125, hence the cultivator disks, each shaft has a sprocket 129 keyed thereto, and a square link or other sprocket chain 131 is shown as trained around each sprocket. The two sprocket chains 131 are independently driven by one of two or more sprockets 132, 133 which are keyed to and movable along each drive shaft 68, 69, that is, each drive shaft has at least two sprockets 132, 133 of different sizes to give a change in speed ratios to adapt the rotation of the disks 126 to different soil conditions. A spring-actuated chain-tightener (not shown) takes up slack in chains 131 when the cultivator attachment is lifted by the operator by means of lever 112. As shafts 68, 69 are adapted to be braked individually (independently), it follows that the two gangs of toothed cultivator disks are individually braked or prevented from rotation whenever the drive wheel on that side of the machine is braked. When making a turn, the entire E-frame carrying both gangs of disks will be raised off the ground and turning will be accomplished with one wheel braked and the other wheel power-driven, one gang of disks being then stationary while the other gang revolves without doing any work. Slight turns or curves in the path of the machine are accomplished without braking the wheels or disks, the swiveled steerable wheels (which are then in front) effecting all minor changes in direction and even right-angle swings (turns in an arc).

The described cultivating machine makes it possible to work the soil thoroughly in as many as 16 rows simultaneously, thus saving an immense amount of time, therefore making it possible to cultivate a field two or three times as often in a season, which is of major importance for certain crops especially in very dry weather. The machine can be used advantageously for cultivating wheat and similar crops. It is my thought that the farmer who owns a twelve-row drill will buy one of my machines with twelve cultivator disks, etc. The disks can of course be shifted along their splined shafts or even removed to suit conditions in the field. In actual use, the toothed disks will drive or propel the machine in most soils, and the "drive" wheels will hold back the machine, as is shown by the condition of the wheel-driving chains.

*The seeder attachment*

The described cultivator attachment has the further important advantage of cooperating with a standard seeder attachment of the type used for sowing clover, timothy, alfalfa and other grass seeds. Alfalfa is particularly hard to start unless drilled in. While clover is commonly sown by hand, most of the crop is lost if a rain washes the seed down to the lower portions of the field. With my cultivator attachment, the seed is scattered uniformly and as it falls on soil being agitated by the revolving teeth, much of the seed is covered by the soil and drilling is unnecessary.

Figures 6, 7, 8:
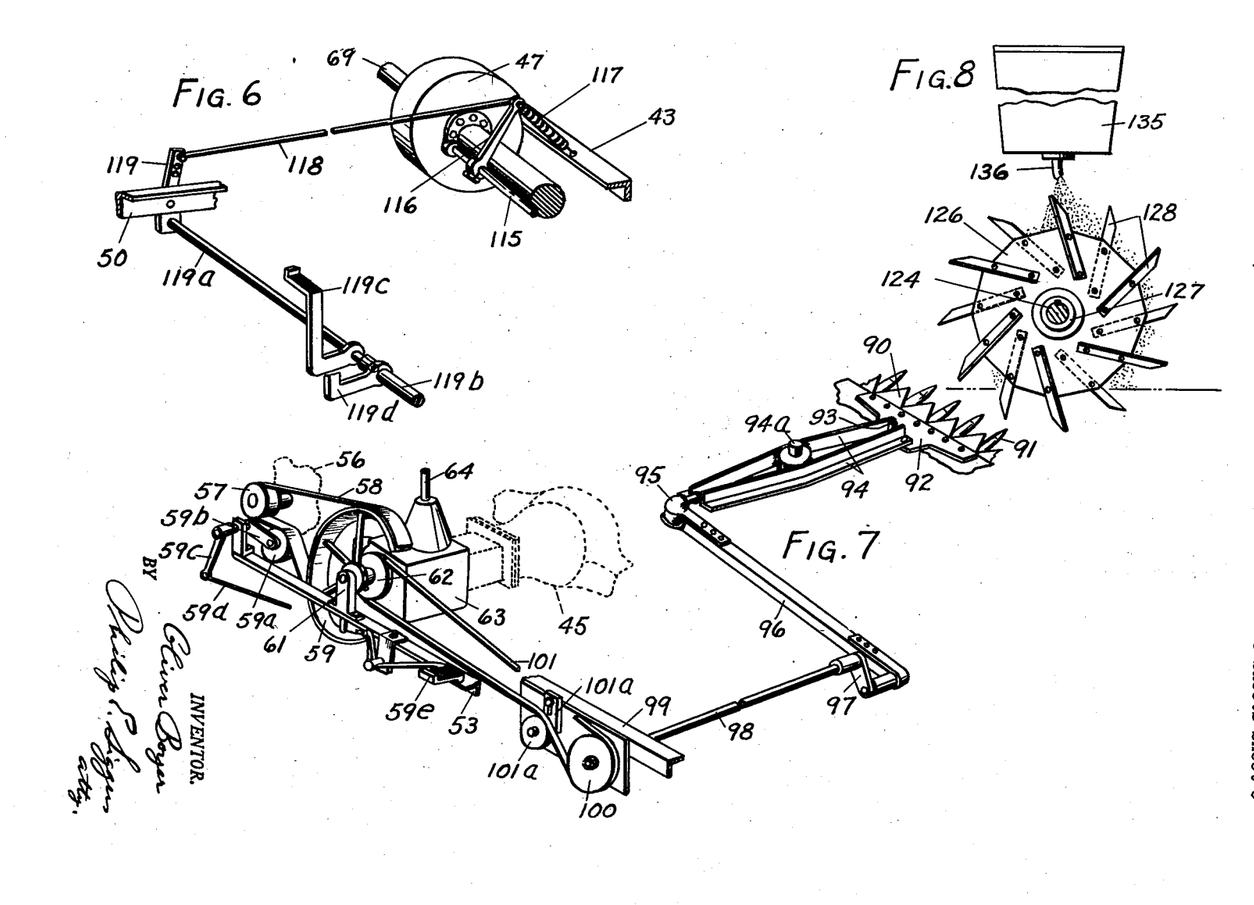
Fig. 6 is a detail in perspective showing part of the mechanisms for controlling the two brakes.
Fig. 7 is a detail in perspective of the power drive for the mower attachment.
Fig. 8 is a sectional elevation showing a seeder attachment associated with the cultivator attachment of the invention.

All this will be understood after referring to Fig. 8, which shows a conventional seeder attachment 135 consisting of a long, narrow box for containing the seed and an agitating or feeding mechanism (not shown) driven by power and adapted to cause all the seed to be delivered through spouts 136 at the bottom side of the seeder. Such a seeder attachment, made to be attached to a grain drill, is equally easily adapted to be carried on my machine, with the seed box rigidly held by brackets (not shown) fixed to the angles 35, 36 to lie transversely of the machine directly above the cultivator disks. Power for feeding the seed may be obtained from the drive shafts 68, 69 by chains and sprockets, as will be understood. The seed from each spout will fall on the revolving and traveling teeth of one of the disks and will be scattered almost uniformly instead of laid down in a "ribbon" of seed separated from other "ribbons" by unseeded strips, as is the case with drilled seed.

*Changing from one attachment to another*

Figures 4, 5:
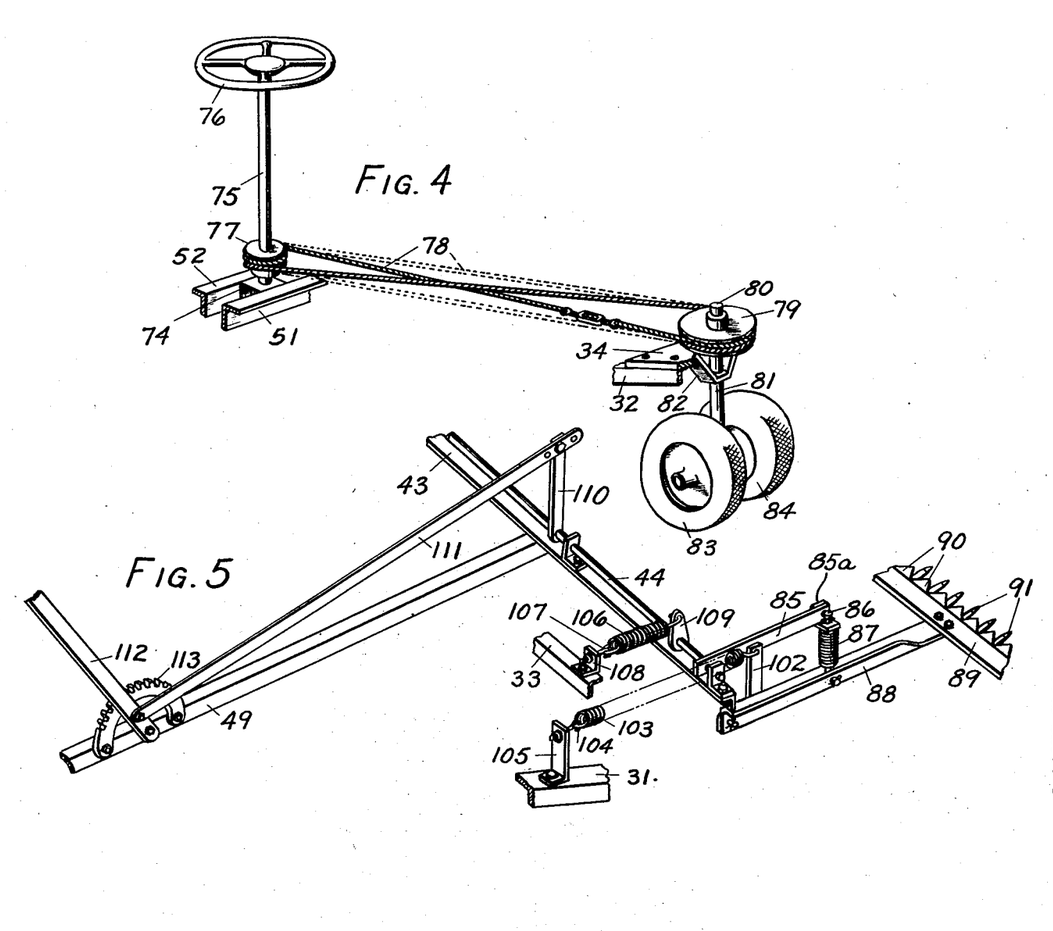
Fig. 4 is a detail in perspective showing the steering mechanism.
Fig. 5 is a detail in perspective showing the major part of the mechanism for raising and lowering the mower cutter bar.

When changing from the mower to the cultivator, besides the removal of one attachment and its replacement by the other, the seat 60 is reversed and shifted until its pedestal or leg 60a straddles the main power pulley, the steering cable is changed, as indicated in dotted lines, Fig. 4, and the brake pedals are shifted so as to be more easily reached and controlled by the feet of the operator. Also the V-belt 101 is taken off, so that shaft 98 is no longer driven, and of course the pitman and universal joint are removed with the mower. The sprocket chains 131 are connected between the cultivator shafts and the power shafts. Helper springs 103 are simply disconnected. As previously stated, the engine is reversed end for end, and a belt-tightener (which works on top of belt 58 to tighten it around the main power pulley) is installed. The preferred belt-tightener is operated by two pedals and a mechanism which locks in either tight-belt or loose-belt position. Instead of a belt-tightener I may use a cone clutch, whose driving member is directly driven by the motor through a chain, with a holding member for holding the clutch disengaged.

From the foregoing description it will be clear that all of the above-listed objects and advantages are realized by the machine of the invention. No summation of these objects and advantages is believed necessary.

Obviously the present invention is not limited to the particular embodiments thereof herein shown and described. Moreover it is not necessary that all the features of the invention be used conjointly, since they may be employed in various combinations and subcombinations.

Having described two aspects of the invention what I claim as new and desire to secure by Letters Patent is:

1. An agricultural machine comprising, in combination, a frame; ground wheels supporting the frame; one of the wheels being swiveled on the frame about a vertical axis; manually operable means on the frame to turn the swiveled wheel; a motor mounted on the frame; mechanism including a differential, a pair of brakes, and a clutch interposed between the motor and the other two wheels and arranged to drive the other two wheels either singly or together, a crop-working implement movably mounted between the driven wheels; means on the frame adapted to be manually operated to raise and lower the implement; mechanism interposed between the motor and the implement and adapted to drive the same whatever its position relative to the ground; operator-controlled means for operating the brakes individually and other operator-controlled means for operating the clutch; the implement being divided into two independently rotating parts, each part being driven from one side of the differential, the same brake which brakes one of the wheels also braking that part of the implement which is adjacent the braked wheel.

2. An agricultural machine comprising, in combination, a frame, ground wheels supporting the frame, at least one of the ground wheels having a swivel attachment with the frame so that it may turn about a vertical axis through approximately 90° in either direction to steer the machine, two other ground wheels being parallel and non-steerable, a motor detachably mounted on the frame, means on the frame and connected with the motor and the non-steerable wheels to drive the latter to propel the machine along the ground, the frame including members adapted to secure the motor with its power shaft directed either toward the steerable wheel or in the opposite direction, a steering wheel on the frame, an operator's seat removably mounted on the frame adjacent the steering wheel, means on the frame permitting the seat to be shifted to face toward either end of the machine, mechanism connecting the steering wheel with the steerable wheel so that the operator may steer the machine while traveling, said mechanism being constructed and arranged to be reversible so that the steering wheel is operated in the same manner to effect the same turns of the machine regardless of which way the operator is facing, an implement for working crops adjustably mounted on the frame between the non-steerable wheels, means connecting the motor with said implement to drive the latter, said last named means including a differential, power shafts driven from opposite ends of the differential, brakes controlling rotation of said power shafts, means for controlling the brakes independently, and mechanisms directly connecting the power shafts with the implement, the implement being divided into two independently rotatable parts which may be driven together or individually stopped by means of the corresponding brake.

3. The invention according to claim 2, wherein the means to drive the non-steerable wheels includes a pulley driven by the motorshaft, a belt driven by the pulley, another pulley driven by the belt, belt-tightening means, operator-controlled means to operate the belt-tightening means, a speed transmission driven by said other pulley, a lever for controlling said speed transmission, said differential being driven by the speed transmission, operator-controlled means for setting each brake, automatically acting means to release each brake, and mechanism connecting each shaft with a non-steerable wheel.

4. An agricultural machine comprising, in combination, a frame; ground wheels supporting the frame; one of the ground wheels being swiveled so that it may turn about a vertical axis to steer the machine; the other two ground wheels being parallel and non-steerable; a detachably mounted motor carried on the frame; means permitting the reversing of the position of the motor on the frame; means on the frame including differential and transmission mechanisms connecting the motor, whatever its position, with the non-steerable wheels to drive the latter to propel the machine in various selected directions, with the swiveled machine steering wheel either at the extreme forward or extreme rear end of the machine; a manually-operable steering wheel on the frame; an operator's seat supported on the frame; means for connecting the seat to the frame selectively on opposite sides of the manually-operable steering wheel so that the steering wheel is always within the grasp of the operator seated on said seat; reversible mechanism connecting the steering wheel with the swiveled ground wheel and being reversed when the operator's seat is shifted thereby to cause the same movements of the manually-operable steering wheel to effect the same turns of the machine regardless of which way the operator is facing; a power-driven implement pivotally mounted on the frame; operator-controlled means on the frame to raise and lower said implement about its pivots; and mechanism actuated by said motor to drive said implement whatever its position on its pivots.

5. An agricultural machine comprising, in combination, a substantially equilateral triangular frame; a pair of propelling wheels adjacent two of the corners of the frame; a steerable wheel at the third corner of the frame; a motor on top of the frame; a motor mount on the frame permitting reversal of the position of the motor relative to the steerable wheel; a seat for the operator secured to the frame; means on the frame permitting reversal of the seat so that the operator may face either toward the steerable wheel or directly in the opposite direction; a steering wheel and column located on the frame so as to be directly in front of the seat whichever way it faces; mechanism connecting the steering wheel with the steerable wheel, said mechanism being readily reversible without changing its construction; a crop-working implement pivotally mounted on the frame to swing between the two propelling wheels; operator-controlled means to connect the propelling wheels individually or simultaneously with the motor; and operator-controlled means to connect the implement with the motor to drive the implement whatever its position.

6. The invention according to claim 5, wherein the means to connect the propelling wheels with the motor consists of a clutch, a speed transmission, means for controlling separately the clutch and the transmission, a differential driven by the transmission, a pair of shafts driven independently by the differential, a brake on each differential-driven shaft, operator-controlled means for applying each brake, automatically acting means for releasing each brake, and mechanism for directly coupling each propelling wheel with a differential-driven shaft.

7. The invention defined in claim 6, wherein the crop-working implement is a two-part rotary cultivator, each part having driving mechanism directly connecting it with one of the differential-driven shafts, so that said cultivator part may be driven or may be braked independently of the other cultivator part.

8. The invention according to claim 5, wherein the crop-working implement is a mower attachment whose over-all length is greater than the distance between the outer faces of the propelling wheels and which is ahead of the propelling wheels as the machine advances.

9. The invention according to claim 5, wherein the means to drive the implement consists of a belt, belt-tightening means, a pulley driven by the belt, a shaft driven by the pulley, a crank rotated by said shaft, a pitman oscillated by said crank, a universal joint on the end of the pitman remote from the pitman, an oscillating arm connected to the pitman through the universal joint, and pivotal means for mounting said oscillating arm about midway of its length.

10. The invention according to claim 5, wherein there is a seed box located between the propelling wheels and having seed-discharging spouts, means supporting the seed box on the frame above the implement, said implement being adapted to agitate the soil and being rotated directly below the discharge spouts of the seed box.

11. An agricultural machine comprising, in combination, a frame; a steerable wheel and a pair of propelling wheels supporting the frame; a motor on the frame; a motor driven differential, differential-driven shafts, and brakes for said shafts all mounted on the frame; operator-controlled mechanism for setting said brakes individually; machine steering means, power-clutch means, power-clutch-control means, transmission and transmission-control means all mounted on the frame; sprocket-chain means independently driven by the brake-controlled shafts and having operative connections with the propelling wheels; an implement consisting of two complementary parts movably mounted between said propelling wheels; means on the frame to control the position of said implement relative to the ground; and mechanism driven by said differential-driven shafts to drive independently the implement parts whatever the position of the implement as a whole.

12. An agricultural machine suitable for cultivating consisting of a frame supported by ground wheels at least one of which is steerable while two others are power-driven, a motor on the frame, means to control the speed of the motor, a motorshaft, a belt driven by the motorshaft, a large pulley driven by the belt, a shaft driven by the large pulley, a transmission driven by the last-mentioned shaft, a lever controlling the transmission, another shaft driven by the transmission, a differential driven by the last-mentioned shaft, a pair of shafts on either side of and driven by the differential, a brake for each of the last-mentioned shafts, operator-controlled means to set each brake, automatically acting means to free each brake, a sprocket fixed to each of the last-mentioned shafts, a sprocket chain trained around each of said sprockets, a pair of aligned but independently driven shafts, toothed cultivating disks fixed at spaced intervals along each of the aligned shafts, a sprocket fixed to each of said aligned shafts and driven by said sprocket chain, means pivoted on the frame to raise and lower said aligned shafts together, operator-controlled means on the machine frame to swing said pivoted means, other sprockets on said shafts which are controlled by said brakes, sprocket chains driven by said other sprockets, sprocket wheels driven by the last-mentioned sprocket chains, and means securing said sprocket wheels to said power-driven ground wheels.

13. In an agricultural machine, in combination, a frame, ground wheels supporting the frame, a motor supported on the frame, clutch-controlled means to connect and disconnect the motor with and from two of the ground wheels thereby to propel the machine, said means including sprockets and sprocket chains directly driving the ground wheels, a cultivator mounted on the frame and including a plurality of rotating toothed disks, means to connect said disks with the motor to drive them, operator-controlled means to couple and uncouple the motor from said disks, operator-controlled means to raise and lower the cultivator at one end of the frame so that the teeth on the disks may enter the soil, the linear speed of the teeth on the disks being always greater than the linear speed of the machine along the ground and the parts being so constructed and proportioned that the machine when working on the soil is normally pushed ahead by the reaction from the contact of the teeth with the soil and is held back by said sprocket chains and the engagement of the ground wheels with the ground.

14. The invention according to claim 13, wherein the sprockets and sprocket chains, which directly drive or hold back the machine through two of the wheels, are each directly driven by a power shaft, there being two such shafts aligned with each other and a differential driving each shaft, a brake for each power shaft, springs automatically releasing said brakes, and operator-controlled means for applying each brake, so that either wheel and its driving means may be stopped while the other wheel is driven through the differential.

15. The invention according to claim 13, wherein the cultivator is in two independently rotating gangs of disks, means connecting said gangs so that the operator may raise and lower the gangs together, the linear speed of both gangs being normally so proportioned to the speed of travel of the machine along the ground that every inch of soil in the path of each disk is penetrated by one of the teeth.

16. An agricultural machine consisting of a chassis, a power unit on the chassis, ground wheels supporting the chassis, means to drive two of the ground wheels from the power unit, a machine-steering wheel also supporting the chassis, a rotary cultivator adjustably mounted on the chassis, said cultivator including a plurality of toothed disks arranged to rotate in vertical planes, mechanism controlled by the operator for coupling or uncoupling the rotary cultivator from the power unit, a seed box fixed on the chassis and having seed-feeding means to discharge seed directly upon the rotating toothed disks.

17. An agricultural machine comprising, in combination, a frame; ground-engaging wheels, at least two of which are arranged on opposite ends of a differential axle fixed to the frame; a motor carried on said frame; a motorshaft driven by the motor; a main power shaft; a transmission driven by the main power shaft and coupled to said differential axle; an implement mounted on the frame and driven by the main power shaft; and a mechanism connecting the motorshaft with the main power shaft and under the direct control of the operator by engagement of one of the operator's limbs with a part of said mechanism, said mechanism serving as a clutch and being so constructed and arranged that it automatically cuts off the flow of power from motor to said implement and said machine the instant the operator's limb is no longer in engagement with said part.

18. An agricultural machine comprising in combination, a frame; ground-engaging wheels affixed to the frame, two of said wheels being propelling wheels at opposite ends of a differential axle coupled to the frame; a motor carried on said frame; a motorshaft driven by the motor; a main power shaft; a transmission driven by the main power shaft and coupled to said differential axle; an implement mounted on the frame and driven by the main power shaft; and a mechanism connecting the motorshaft with the main power shaft and serving as a clutch, said mechanism including a pedal supported on the frame and adapted to be depressed by the foot of the operator to hold the motorshaft in driving engagement with the main power shaft, said mechanism being so constructed and arranged that when said pedal is no longer depressed as stated, the motorshaft may no longer drive the main power shaft and hence the machine and implement are no longer driven by the power plant.

19. The invention defined in claim 18, wherein there are brakes mounted on the differential axle at the wheel ends, means to automatically release the brakes, and operator-controlled means to set the brakes individually.

20. The invention defined in claim 19, wherein there are two implement-driving mechanisms driven by the two ends of said differential shaft at points between the brakes and the propelling wheels, and the implement itself is operatively two distinct but co-operating parts, each such part being directly driven by one of said implement driving mechanisms.

21. An agricultural machine comprising a main frame; a steerable ground wheel mounted on the frame; a pair of rigid members fixed to the frame at one end thereof and extending horizontally parallel to each other; a pair of machine-propelling ground wheels mounted by stub axles respectively upon said rigid frame-affixed members; a power plant on said frame; mechanism under the control of the operator for driving said propelling wheels individually or together; an implement mounted on members which are pivotally supported on the frame between said pair of rigid members, said implement being adapted to receive part of its support from the ground; operator-controlled mechanism mounted on the frame and adapted to swing said implement off the ground so that it is carried wholly by the main frame; and mechanism operable whatever the position of the implement to drive the same by power from the power plant, the last-named mechanism being under the control of the operator.

22. The invention defined in claim 17, wherein the implement is a readily removable mowing attachment including a reciprocating section bar having knives, a section head secured to the section bar, a rocker arm, a pivotal connection between an end of the rocker arm and the section head, the rocker arm being pivotally supported intermediate its ends by a pivotal means, an adjustable frame supporting said pivotal means, said adjustable frame being on one end of the machine frame, a grooved pulley driven by the motorshaft, a V-belt driven by the grooved pulley, a larger grooved pulley driven by the V-belt, a shaft driven at one end by the larger grooved pulley, a crank on the other end of said shaft, a pitman driven by the crank, a universal joint on the other end of the pitman, said rocker arm being connected at its other end to said universal joint, the motorshaft thereby reciprocating the knives of the mowing attachment.

23. The invention defined in claim 22, wherein there are a pair of shafts driven from opposite sides of the differential, a brake operatively connected to each of the differential-driven shafts, operator-controlled mechanism to apply each brake individually, a sprocket fixed to each differential-driven shaft, a sprocket chain trained about each sprocket, and a sprocket wheel driven by each sprocket chain and fixed to one of the ground-engaging wheels.

24. A self-propelled cultivator comprising, in combination, a chassis; a motor mounted on the chassis; a pair of ground wheels supporting the chassis and adapted to be driven by the motor to propel the cultivator, at least one steerable ground wheel also supporting the chassis; a rotary soil-agitating device mounted on the chassis at one end thereof, said soil-agitating device including a plurality of teeth adapted to enter the soil almost vertically to dig into the soil; means on the chassis and under the control of the operator to raise and lower the soil-agitating device relative to the ground; operator-controlled mechanism connecting the soil-agitating device with the power unit so that the soil-agitating device has such a speed and such engagement with the soil as normally to propel the machine by the reaction from the soil engagement; and means connecting the motor with the driven ground wheels and being so constructed and arranged that the driven ground wheels act as hold-back means when the rotary soil-agitating device propels the cultivator by engagement with the soil, the driven ground wheels assuming their normal machine-propelling function when the rotary soil-agitating device is disengaged or partly disengaged from contact with the soil by action of the operator.

25. An agricultural machine comprising a chassis; a power unit mounted on the chassis; ground wheels supporting the chassis; a rotary cultivator adjustably mounted on the chassis; said cultivator including two independently rotating gangs of toothed disks adapted to rotate in vertical planes; means connecting the gangs of disks so that the operator may raise and lower the gangs together; means independently connecting each gang of disks with the power unit, said last named means including a differential, two power shafts driven by the differential, a brake for each power shaft, and operator-controlled means for applying each brake, there being automatically acting means for releasing each brake; mechanism directly coupling two of the ground wheels with a differential-driven power shaft; a seed box fixed to the chassis directly above the gangs of disks to extend transversely of the machine, said seed box including a plurality of seed-delivering spouts so that seed from each spout will fall on the revolving and traveling teeth of one of the disks and will be scattered and immediately covered at least in part by the agitated soil.

References Cited in the file of this patent

UNITED STATES PATENTS

| Number | Name | Date |
|---|---|---|
| 26,630 | Tracy | Dec. 27, 1859 |
| 631,473 | Peden | Aug. 22, 1899 |
| 888,103 | Liebhart | May 19, 1908 |
| 928,452 | Houghland | July 20, 1909 |
| 1,148,505 | Dunning | Aug. 3, 1915 |
| 1,189,378 | Mohr | July 4, 1916 |
| 1,198,445 | Horacek | Sept. 19, 1916 |
| 1,301,384 | Carter | Apr. 22, 1919 |
| 1,778,334 | Pedersen | Oct. 14, 1930 |
| 1,843,095 | Urschel | Jan. 26, 1932 |
| 1,887,334 | Spaeth | Nov. 8, 1932 |
| 1,932,717 | Wickersham | Oct. 31, 1933 |
| 2,046,046 | Washington | June 30, 1936 |
| 2,098,860 | Creech | Nov. 9, 1937 |
| 2,268,923 | Bryant | Jan. 6, 1942 |
| 2,279,652 | Beard | Apr. 14, 1942 |
| 2,291,987 | Rogers | Aug. 4, 1942 |
| 2,370,866 | Lewis | Mar. 6, 1945 |

FOREIGN PATENTS

| Number | Country | Date |
|---|---|---|
| 666,367 | France | Oct. 1, 1929 |